(12) United States Patent
Urakami

(10) Patent No.: US 10,913,164 B2
(45) Date of Patent: Feb. 9, 2021

(54) SUCTION-ADHERING AND SELF-PROPELLED ROBOTIC DEVICE

(71) Applicant: URAKAMI LLC, Kanagawa (JP)

(72) Inventor: Fukashi Urakami, Kanagawa (JP)

(73) Assignee: URAKAMI LLC, Kanagawa (JP)

( * ) Notice: Subject to any disclaimer, the term of this patent is extended or adjusted under 35 U.S.C. 154(b) by 52 days.

(21) Appl. No.: 16/149,199

(22) Filed: Oct. 2, 2018

(65) Prior Publication Data

US 2019/0030731 A1 Jan. 31, 2019

Related U.S. Application Data

(63) Continuation of application No. PCT/JP2017/011412, filed on Mar. 22, 2017.

(30) Foreign Application Priority Data

Apr. 3, 2016 (JP) .................................. 2016-074818

(51) Int. Cl.
 *B25J 15/06* (2006.01)
 *A47L 1/02* (2006.01)
 *A47L 11/38* (2006.01)

(52) U.S. Cl.
 CPC ............. *B25J 15/0683* (2013.01); *A47L 1/02* (2013.01); *A47L 11/38* (2013.01); *A47L 2201/00* (2013.01)

(58) Field of Classification Search
 CPC ...... B62J 15/0683; B62J 11/0085; A47L 1/02; A47L 11/38; A47L 2201/00
 (Continued)

(56) References Cited

U.S. PATENT DOCUMENTS 5,839,532 A * 11/1998 Yoshiji .................. B62D 57/00
  180/164
2003/0048081 A1* 3/2003 Seemann ............... B62D 55/00
  318/68

(Continued)

FOREIGN PATENT DOCUMENTS

JP  H5-042063 A  2/1993
JP  H11-79019 A  3/1999

(Continued)

OTHER PUBLICATIONS

International Search Report for PCT Application No. PCT/JP2017/011412 issued by JPO dated Oct. 31, 2017.

*Primary Examiner* — Ruth Ilan
*Assistant Examiner* — Felicia L. Brittman
(74) *Attorney, Agent, or Firm* — Kubotera & Associates, LLC

(57) ABSTRACT

A robotic device that can adhere to the surface of an object by negative-pressure suction and that can travel in a Y-axis direction and an X-axis direction. The robotic device is equipped with four suction cup units, Y-axis actuators and X-axis actuators. As for the planar shape of each suction cup, it has a shape of each quadrangle when a roughly square was divided into four quadrangles of the same shape. The quadrangles are formed provided with two right-angle portions in a diagonal portion. One right angle of the two right-angle portions of each suction cup overlaps with one of the four right angles of the square. Two of the sides that constitute the above right angle of the suction cup overlap with two of the edges that constitute the above right angle of the square. One of the sides that constitute another right angle of the suction cup intersects to an acute angle in one side of the right angle of the square, and another side (Continued)

intersects to an obtuse angle in another side of the right angle of the square.

4 Claims, 13 Drawing Sheets

(58) Field of Classification Search
USPC .......................................................... 180/164
See application file for complete search history.

(56) References Cited

U.S. PATENT DOCUMENTS

| | | |
|---|---|---|
| 2006/0143845 A1 | 7/2006 | Miyake et al. |
| 2007/0235329 A1 | 10/2007 | Urakami |
| 2012/0215348 A1* | 8/2012 | Skrinde .................. B08B 9/049 700/245 |
| 2013/0206492 A1* | 8/2013 | Urakami .................. A47L 1/02 180/164 |
| 2014/0216836 A1* | 8/2014 | Davies .................. B62D 55/06 180/164 |

FOREIGN PATENT DOCUMENTS

| | | |
|---|---|---|
| JP | 2012-061116 A | 3/2012 |
| WO | 2004-028324 A1 | 4/2004 |
| WO | 2005-105557 A1 | 11/2005 |

* cited by examiner

SUCTION-ADHERING AND SELF-PROPELLED ROBOTIC DEVICE

CROSS-REFERENCE TO RELATED APPLICATIONS

This is a continuation application of a prior PCT application No. PCT/JP/2017/011412 filed on Mar. 22, 2017.

BACKGROUND OF THE INVENTION AND RELATED ART STATEMENT

The present invention relates to a robotic device which performs adhering to by vacuum and travelling on a surface of an object, or relates to a robotic device which performs adhering to by vacuum and travelling on a surface of an object while cleaning the surface such as window glass of a building.

Japanese Laid-Open Patent Publication No. 5-42063 proposes a device which adheres to a surface and can be moved along the surface including: four sets of vertical expansion and contraction means; one set of width direction expansion and contraction means disposed for each one of the four sets of vertical expansion and contraction means; suction cups of which is disposed for each one of the width direction expansion and contraction means; and first putting forward/backward means interposed between the suction cup and the width direction expansion and contraction means, the device being characterized in that each of the suction cups is selectively set at least in the following three states: (1) a adhering and movable state in which the device can be moved along the surface and in close contact with the surface; (2) a adhering and locked state in which the device adheres to the surface in a locked manner; and (3) a non-adhering and movable state in which the device is separated from the surface and can be moved along the surface.

In the above-described device, the device adheres to a surface and can be moved along the surface in which, in the case where a protruding bar such as a window glass frame exists on the surface, and when the protruding bar extends in the horizontal direction and the vertical direction and has a number of crossing portions, the device can be moved by stepping over the protruding bar in either of the horizontal direction or the vertical direction. Japanese Laid-Open Patent Publication No. 2012-6116 proposes "a cleaning device for a window glass or the like", wherein, in three suction cups which are arranged in a row, each of the suction cups includes height direction expansion and contraction means of suction cup for putting the suction cup in and out in a direction intersecting with a surface, the suction cups adjacent to each other are coupled by transverse expansion and contraction means via the height direction expansion and contraction means of suction cup, when the three suction cups coupled by the transverse expansion and contraction means via the height direction expansion and contraction means of suction cup are referred to a row suction cup group, three row suction cup groups are arranged in the longitudinal direction, the row suction cup groups adjacent to each other are coupled by lengthwise expansion and contraction means via the height direction expansion and contraction means of suction cup, each of the suction cups can be selectively set in either one of the following three states: a adhering and movable state in which the suction cup adheres to the surface and moves along the surface; a adhering and locked state in which the suction cup adheres to the surface and is locked to the surface; and a non-adhering and movable state in which the suction cup is separated from the surface and can move along the surface, each of the suction cups is constituted at least by a suction cup frame member, a vacuum sealing member attached to the suction cup, moving means, and locking means, and at least the surface, the suction cup frame member, and the vacuum sealing member define a reduced pressure space in cooperation, the reduced pressure space being coupled to vacuum generating means and vacuum breaking means.

In the above-described device, the device can step over a window sash in a horizontal direction or a vertical direction when there are many window sashes that extend to a horizontal direction and both vertical directions and intersect on the surface of an object.

[Patent Reference 1]
Japanese Laid-Open Patent Publication No. 5-42063
[Patent Reference 2]
Japanese Laid-Open Patent Publication No. 2012-6116

SUMMARY OF THE INVENTION

In the conventional method to clean the dirt which attached to the smooth object surface such as window glass, at first a cleaning agent is sprayed to the surface of an object or the surface of an object is got wet by a sponge with a cleaning agent, in the next step the dirt with the cleaning agent is scraped off by a handheld tool with the rubber blade named "squeegee".

The free end of the vacuum sealing member of the present invention has the same function as the free end of the rubber blade of the squeegee that scrapes off the dirt and the cleaning agent.

Furthermore, the suction cup of the present invention has also a function to adhere to the surface of an object in addition to the function that scrapes off the dirt and the cleaning agent. Therefore, as for the cross-sectional shape of the vacuum sealing member that is cut at a parallel plane by the surface, the cross-sectional shape has not a shape of a linear such as the rubber blade of the squeegee but has a shape of an annular quadrangle that is surrounded by the free end of the vacuum sealing member.

Describes the arrangement of four sucking desks, there is placed in one line on X-axis the suction cup group that is comprised of two suction cups that is located to be next each other, there is placed in one line on X-axis the other suction cup group that is comprised of two suction cups that is located to be next each other, there are placed the two suction cup groups that are located in two lines on Y-axis to be next each other.

It may happen the problem that the dirt and the cleaning agent is not scrapped off completely if there is a gap between two suction cups located to be next when the suction cup groups move to clean the window glass on the surface of an object.

As for the major theme to be solved by the present invention, it should be researched what is the most suitable shape of each suction cup and what is the most suitable shape of each suction cup group in order to realize the most suitable method for the complete window glass cleaning without the remained the dirt and the cleaning agent.

In the present invention, the following consideration is carried out and a solution is suggested as follows in order to solve the problem above mentioned.

As for the shape of the window glass of the large buildings in general, it is the shape of the rectangular parallelepiped with the right angle in 4 corners. Therefore, it is desirable for the shape of the outside corner part of the suction cup to be a right angle that comes in contact with the corner part of the window glass in order to scrape off the dirt and the cleaning agent on the window glass.

As for the relation of the arrangement between the suction cups next to each other on the X-axis;

as for the relation of the arrangement between the outside vicinity that is on a X-axis and constitutes a right angle of a suction cup and the other outside vicinity that is on the same X-axis and constitutes the other right angle of the other suction cup, the two vicinities should be on the same X-axis in order to scrape off the dirt and the cleaning agent on the window glass at a corner part nearly a window frame.

Considering about the angle that is constructed by the diagonal side of one suction cup and X-axis, and considering about the angle that is constructed by the diagonal side of the other suction cup and X-axis, and considering about that the diagonal side of one suction cup and the diagonal side of the other suction cup are parallel and next to each other, and considering from the standpoint that the dirt and the cleaning agent should not be remained on the surface of an object; it is desirable for the angle that the diagonal side and X-axis of one suction cup intersect to be an acute angle, and it is desirable for the angle that the diagonal side and X-axis of the other suction cup intersect to be an obtuse angle.

By the above-mentioned consideration, it is concluded that the desirable planar shape of each suction cup should be the quadrangle with two right angles at the opposite angle.

As for the relation of the arrangement between the suction cups next to each other on the Y-axis;

as for the relation of the arrangement between the outside vicinity that is on a Y-axis and constitutes a right angle of a suction cup and the other outside vicinity that is on the same Y-axis and constitutes the other right angle of the other suction cup, the two vicinities should be on the same Y-axis in order to scrape off the dirt and the cleaning agent on the window glass at a corner part nearly a window frame.

Considering about the angle that is constructed by the diagonal side of one suction cup and Y-axis, and considering about the angle that is constructed by the diagonal side of the other suction cup and Y-axis, and considering about that the diagonal side of one suction cup and the diagonal side of the other suction cup are parallel and next to each other, and considering from the standpoint that the dirt and the cleaning agent should not be remained on the surface of an object; it is desirable for the angle that the diagonal side and Y-axis of one suction cup intersect to be an acute angle, and it is desirable for the angle that the diagonal side and Y-axis of the other suction cup intersect to be an obtuse angle.

By the above-mentioned consideration, it is concluded that the desirable planar shape of each suction cup should be the quadrangle with two right angles at the opposite angle.

In conclusion, when one suction cup group is formed by assembling the four suction cups of the same planar shape equipped with the above conditions, the shape of the outside of the suction cup group is a square, and the acute angle of each suction cup is about 63 degrees.

When one suction cup group is formed by assembling four suction cups of the same planar shape, the shape of the outside of the suction cup group is a square; in order to achieve the object of the present invention that the device of the present invention can be moved by self-propulsion under negative pressure in any direction, either in the Y-axis direction or in the X-axis direction along the surface of the object, and moreover, without leaving dirt and water adhering to the object surface such as window glass, in addition, in order to achieve the object of the present invention to carry out a cleaning operation.

As a result of pursuing improvement of the function of the device, the present invention contributes to making the device compact and lightweight, reducing the manufacturing cost and maintenance cost of the device, without leaving dirt in both the X axis direction and the Y axis direction. It is possible to perform high-quality work without the above-mentioned problems, it is possible to improve work efficiency, improve workability by improving the portability and storageability of the device, expand the applicable range of the device, improve versatility, improvement of the aesthetic value on the surface, and the like.

FIG. 6 and FIG. 7 are schematic views in which there are two types of the suction cup group. Each suction cup group has a square outer shape that is formed by assembling four suction cups having the same planar shape.

As understood from the schematic view of FIG. 7, there is a gap between the adjacent suction cups, but the suction cup group moves along the surface of the object while moving in the direction of the X-axis and the Y-axis while cleaning, it is possible to carry out the cleaning work without leaving dirt and water stuck to the surface of the object.

In order to solve the technical problems described in the above, provided according to the present invention as described in claim 1 and claim 2, comprising a suction-adhering and self-propelled robotic device, comprising:

a suction-adhering and self-propelled robotic device that can adhere to the surface of an object by negative-pressure suction and that can travel in a Y-axis direction and an X-axis direction, in addition, the robotic device that can travel by itself to the appointed direction without the operation for the device to be rotated in parallel to the surface of an object, comprising: the robotic device is equipped at least with four suction cup units that are arranged in two rows with two units in a row respectively, Y-axis actuators that move each suction cup unit to the Y-axis direction and X-axis actuators that move each suction cup unit to the X-axis direction;

the suction cup unit is equipped with a suction cup, a frictional force adjustment mechanism that is equipped with the suction cup in order to decrease or to increase the friction between the suction cup and the surface of an object, and a fluid extraction means that is communicated with and extracts a fluid from a negative-pressure space that is surrounded by the suction cup and the surface of an object;

the suction cup is comprised of a suction cup frame member and a vacuum sealing member that is put on in the outer peripheral portion of the suction cup frame member;

the frictional force adjustment mechanism is comprised of a mechanism wherein the frictional force between the suction cup and the surface of an object is decreased by means to push strongly a slippery material such as a roller to the surface of an object;

or the frictional force adjustment mechanism is comprised of another mechanism wherein the frictional force between the suction cup and the surface of an object is decreased by means to decrease the pressure of a negative-pressure space that is surrounded by the suction cup and the surface of an object;

as for the planar shape of each suction cup, it has a shape same as each quadrangle when a roughly square was divided into four quadrangles of the same shape except the small square part of the center, the quadrangles are formed provided with two right-angle portions in a diagonal portion, one right angle of the two right-angle portions of each suction cup overlaps with one of the four right angles of the square, two of the sides that constitute the above right angle of the suction cup overlap with two of the edges that constitute the above right angle of the square, one of the sides that constitute another right angle of the suction cup intersects to an acute angle in one side of the right angle of the square, and another side intersects to an obtuse angle in another side of the right angle of the square;

a suction-adhering and self-propelled robotic device according to claim 1, wherein an angle of the acute angle is almost approximately 63 degrees.

In the suction-adhering and self-propelled robotic device of the present invention as described in claim 1 or claim 2 that comprises the suction-adhering and self-propelled function that can adhere to the surface of an object by negative-pressure suction and that can travel in a Y-axis direction and an X-axis direction, furthermore, the robotic device comprises the function that can travel across a windowpane frame as described in claim 3, wherein:

a Z-axis actuator for moving each of the suction cup units in the Z-axis direction crossing the object surface, so that the suction cup has a function of separating the suction cup from the surface of an object when the suction cup is needed to be set apart from the surface of an object.

In the suction-adhering and self-propelled robotic device of the present invention as described in any one of claims 1 to claim 3, furthermore, the robotic device comprises the function that can prevent scattering of the dirt and the water on the surface of an object such as window glass after being scraped the dirt and the water as described in claim 4, wherein:

a suction-adhering and self-propelled robotic device according to claim 1 to claim 3, wherein a second sucking disk is formed at the outer peripheral portion of each sucking disk, wherein the second sucking disk is comprised of a second sucking disk frame member fixed at the outer peripheral portion of the sucking disk frame member, wherein the second sucking disk is also comprised of a second vacuum sealing member that is put on in the outer peripheral portion of the second sucking disk frame member, wherein it is formed the second negative-pressure space that is surrounded by the sucking disk frame member, the vacuum sealing member, the second sucking disk frame member, the second vacuum sealing member and the surface of an object, wherein the second negative-pressure space is communicated with a second fluid extraction means that extracts a fluid from the second negative-pressure space, wherein a fluid jetting nozzle is equipped with the second negative-pressure space, wherein a fluid such as water or cleaning agent is ejected toward the surface of an object from the fluid jetting nozzle.

The present invention is to provide the suction-adhering and self-propelled robotic device having the features as follows.

The present invention contributes to making the device compact and lightweight, reducing the manufacturing cost and maintenance cost of the device, without leaving dirt in both the X axis direction and the Y axis direction.

It is possible to perform high-quality work without the above-mentioned problems, it is possible to improve work efficiency, improve workability by improving the portability and storageability of the device, expand the applicable range of the device, improve versatility, improvement of the aesthetic value on the surface, and the like.

FIG. 6 and FIG. 7 are schematic views in which there are two types of the suction cup group. Each suction cup group has a square outer shape that is formed by assembling four suction cups having the same planar shape.

As understood from the schematic view of FIG. 7, there is a gap between the adjacent suction cups, but the suction cup group moves along the surface of the object while moving in the direction of the X-axis and the Y-axis while cleaning, It is possible to carry out the cleaning work without leaving dirt and water stuck to the surface of the object.

DETAILED DESCRIPTION OF PREFERRED EMBODIMENTS

Preferred embodiments of the device configured according to the present invention will be described in detail below, referring to the figures attached hereto.

Figure 1:
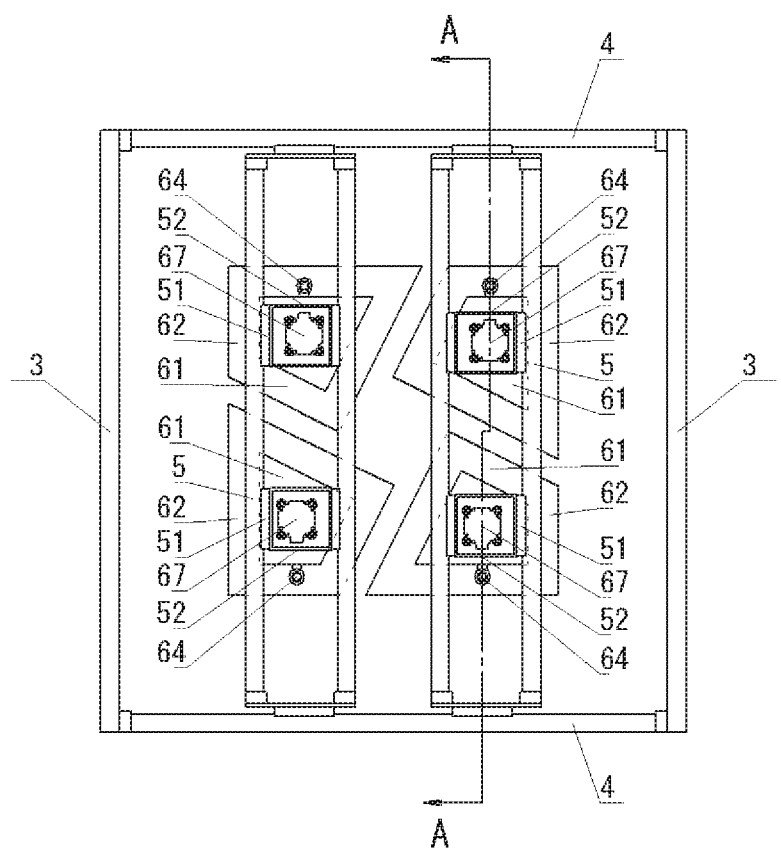
FIG. 1 is a front view of a first preferred embodiment of the device constructed in accordance with the present invention.
Figure 2:
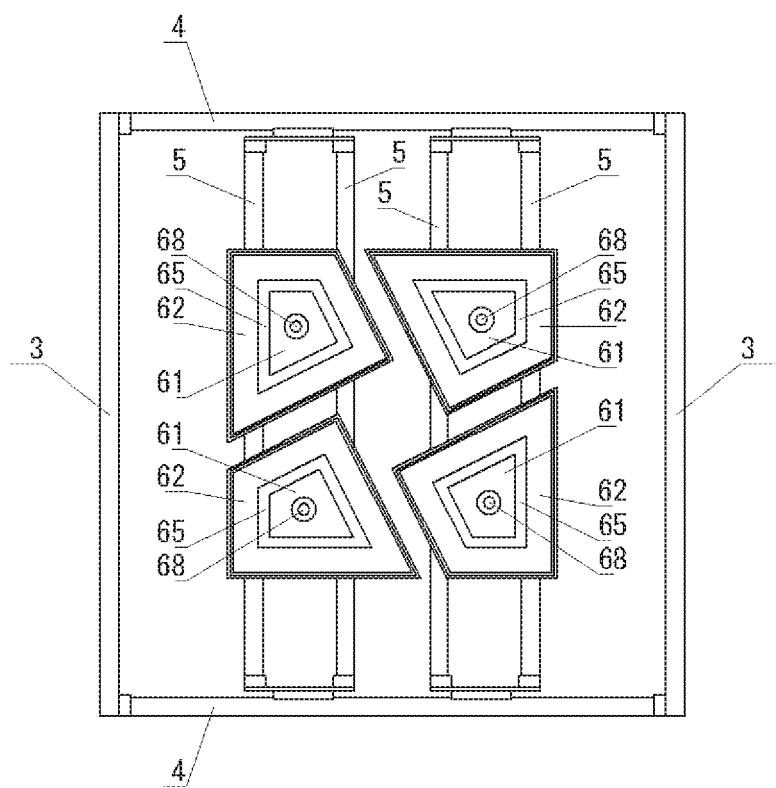
FIG. 2 is a rear view of the device shown in FIG. 1 as seen from the direction of the object surface.
Figure 3:
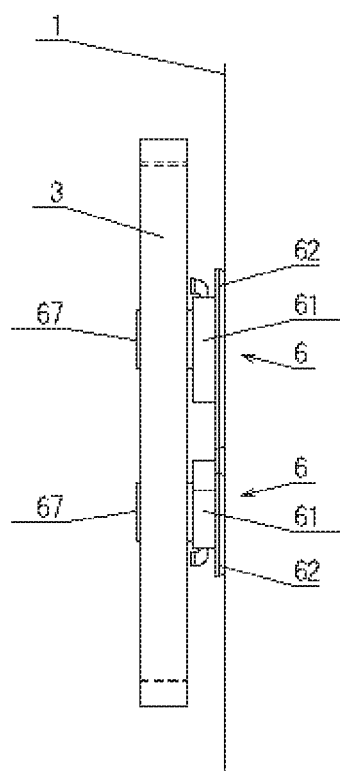
FIG. 3 is a right side view of the device shown in FIG. 1.

In FIG. 1 to FIG. 8, the first embodiment of the present invention, comprising:

FIG. 1 illustrates a front view of the device of the present invention under suction-adhering to a vertical object surface 1.

In FIG. 1, the vertical direction is the actual vertical direction and is referred to as the Y-axis direction.

In FIG. 1, the left-right direction is the actual horizontal direction and is referred to as the X-axis direction.

In the present specification, a direction orthogonal to the object surface 1 is referred to as a Z-axis direction, a direction approaching the object surface 1 is referred to as a front side, and a direction away from the object surface 1 is referred to as a back side.

In a robotic device capable of self-propulsion in an appointed direction in either the Y-axis direction or the X-axis direction along the object surface 1 by suction-adhering to the object surface 1 such as a window glass, furthermore, in a robotic device capable of self-propulsion in the appointed direction without the operation for the device to be rotated in parallel to the object surface 1, comprising:

the robotic device illustrated is equipped at least with four suction cup units that are arranged in two rows with two units in a row respectively, Y-axis actuators that move each suction cup unit to the Y-axis direction and X-axis actuators that move each suction cup unit to the X-axis direction;

the suction cup unit is equipped with a suction cup 6, a frictional force adjustment mechanism that is equipped with the suction cup 6 in order to decrease or to increase the friction between the suction cup 6 and the surface of an object 1, and a fluid extraction means that is communicated with and extracts a fluid from a negative-pressure space that is surrounded by the suction cup 6 and the surface of an object 1;

the suction cup 6 is comprised of a suction cup frame member 61 and a vacuum sealing member 62 that is put on in the outer peripheral portion of the suction cup frame member 61;

The suction cup frame member 61 has a box shape opened in a direction facing the object surface 1, and a quadrangular annular suction cup seal member 62 formed from a flexible material such as polyurethane is fixed to a flange portion located in the opened portion of the suction cup frame member 61, and a quadrangular annular locking member 65 made of a material having a large friction coefficient such as rubber is fixed to the flange portion.

The free end portion of the suction cup seal member 62 moves while contacting the object surface 1 to clean the object surface 1.

The object surface 1, the suction cup frame member 61, and the suction cup seal member 62 cooperate with each other to define a suction cup negative pressure space 63, and the suction cup negative pressure space 63 is communicated with a suction generating means (not shown) via a suction hose 641.

the frictional force adjustment mechanism is comprised of a mechanism wherein the frictional force between the suction cup 6 and the surface of an object 1 is decreased by means to push strongly a slippery material such as a roller to the surface of an object 1;

or the frictional force adjustment mechanism is comprised of another mechanism wherein the frictional force between the suction cup 6 and the surface of an object 1 is decreased by means to decrease the pressure of a negative-pressure space that is surrounded by the suction cup 6 and the surface of an object 1;

Each of the suction cup units has a Z-axis cylinder 67 mounted with a ball roller 68 at a tip portion of the piston rod.

When the piston rod of the Z-axis cylinder 67 protrudes, since the locking member 65 moves away from the object surface 1, the friction between the locking member 65 and the object surface 1 disappears, so that the suction cup unit can move along the object surface 1.

When the piston rod of the Z-axis cylinder 67 is retracted, since the locking member 65 is strongly pressed against the object surface 1, the friction between the locking member 65 and the object surface 1 increases, so that the suction cup unit is locked to the object surface 1.

The cylinder case of the Z-axis cylinder 67 is fixed to the suction cup frame member 61.

For each state of the suction cup unit, the following two states can be arbitrarily selected. That is, an adsorption movable state which is adsorbed to the object surface 1 and is moved along the object surface 1, or an adsorption locked state in which it attracts to the object surface 1 and is locked to the object surface 1.

As for the planar shape of each suction cup 6, it has a shape same as each quadrangle when a roughly square was divided into four quadrangles of the same shape except the small square part of the center, the quadrangles are formed provided with two right-angle portions in a diagonal portion, one right angle of the two right-angle portions of each suction cup 6 overlaps with one of the four right angles of the square, two of the sides that constitute the above right angle of the suction cup 6 overlap with two of the edges that constitute the above right angle of the square, one of the sides that constitute another right angle of the suction cup 6 intersects to an acute angle in one side of the right angle of the square, and another side intersects to an obtuse angle in another side of the right angle of the square, wherein the angle of the acute angle is almost approximately 63 degrees.

In the device shown in FIGS. 1 to 8, the adjacent suction cups on the X-axis are communicated with each of two pistons of two X-axis dual rodless cylinders 4 via two Y-axis dual rodless cylinders 5 so that each suction cup 6 can move in an arbitrary direction on the X-axis at an arbitrary time.

The adjacent suction cups on the Y-axis are connected to each of two pistons of two Y-axis dual rodless cylinders 5 so that each suction cup 6 can move in an arbitrary direction on the Y-axis at an arbitrary time.

It is to be noted that the dual rodless cylinder is a general slit type rodless cylinder provided with two piston rods, and each of the two piston rods is movable in a direction away from each other at an arbitrary time, or to move in the same direction.

Figure 13:
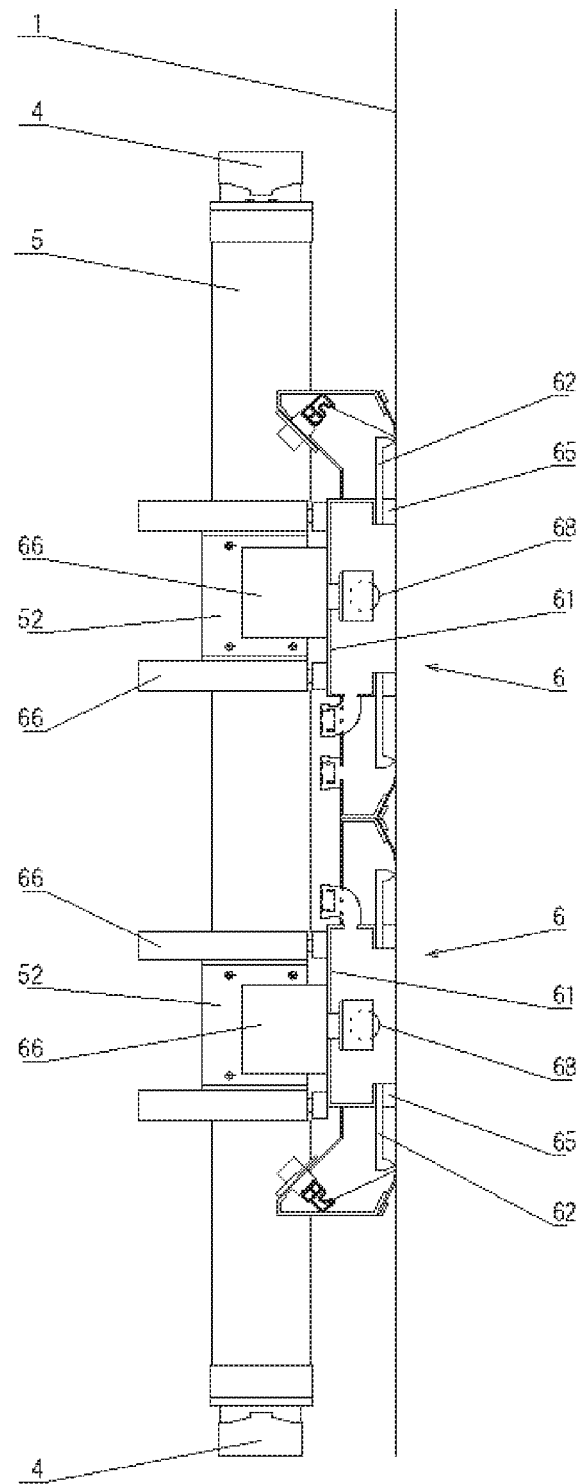
FIG. 13 is an enlarged cross-sectional view showing a state in which the suction cup Z-axis moving cylinder 8 is provided in the device shown in FIGS. 9 to 12.

Each of the suction cup units in the device shown in FIGS. 1 to 8 is not equipped with Z-axis actuators 8 that move each suction cup 6 to the Z-axis direction intersecting the surface of an object 1, however it is easy for the suction cup 6 to be equipped with Z-axis actuators 8 as will be understood with reference to FIG. 13.

Describes a method of connecting the Z-axis cylinder 8 to each of the two pistons of the X-axis dual rodless cylinder 4, the side surface portion of the cylinder case of the Z-axis cylinder 8 is fixed to the piston through the suction cup connecting fitting 52.

In the case where the Z-axis cylinder 8 is provided in the device, the adjacent suction cups on the X-axis are connected to each of the two pistons of two X-axis dual rodless cylinders 4, via each Z-axis cylinder 8 and each of two Y-axis dual rodless cylinders 5, so that each suction cup 6 can move in an arbitrary direction on the X-axis at an arbitrary time.

The adjacent suction cups on the Y-axis are connected to each of the two pistons of two Y-axis dual rodless cylinders 5, via each Z-axis cylinder 8 and each of two Y-axis dual rodless cylinders 5, so that each suction cup 6 can move in an arbitrary direction on the Y-axis at an arbitrary time.

Describes below the effect of the case where the Z-axis moving cylinder 8 is provided in the device, as described in connection with claim 3, the device of the present invention can step over the window glass frame in addition to that the device can adhere to the surface 1 and travel on the surface 1 in either of the X-axis direction or the Y-axis direction.

In the suction-adhering and self-propelled robotic device of the present invention as described in claim 1 or claim 2, the device is equipped with the Z-axis actuators for moving each of the suction cup 6 in the Z-axis direction crossing the object surface 1, so that the suction cup 6 has a function of separating the suction cup 6 from the surface of an object 1 when the suction cup 6 is needed to be set apart from the surface of an object 1.

The device shown in FIG. 13 comprises a Z-axis actuator which moves each suction cup unit in a direction generally orthogonal to the object surface 1. That is, the device has a function of separating the suction cup 6 from the object surface 1 at an arbitrary time.

For each state of the suction cup unit, the following three states can be arbitrarily selected. That is, an adsorption movable state which is adsorbed to the object surface 1 and is moved along the object surface 1, or an adsorption locked state in which it attracts to the object surface 1 and is locked to the object surface 1, or a non-adsorptive movable state which is not adsorbed to the object surface 1 and is moved along the object surface 1.

Describes in detail the device according to the second embodiment of the present invention with reference to FIGS. 9 to 12, comprising: a second suction cup is provided at the outer peripheral portion of each suction cup 6;

the second suction cup is comprised of a second suction cup frame member 61 connected to the outer peripheral portion of the suction cup frame member 61 of the suction cup 6 and a second suction cup seal member 62 attached to the outer peripheral portion of the second suction cup frame member 61;

it is formed the second negative pressure space surrounded by the suction disk frame member 61, the suction disk seal member 62, the second suction cup frame member 61, the second suction cup seal member 62 and the object surface 1, it is communicated with the second negative pressure space the second fluid extraction mechanism for extracting fluid from the space, it is equipped with the second negative pressure space the fluid ejecting nozzle for ejecting a fluid such as water or cleaning agent toward the object surface 1;

In the device shown in FIGS. 9 to 12 described above; the object surface 1, the suction cup frame member 61, the suction cup seal member 62, the second suction cup frame member 61, and the second suction cup seal member 62 cooperate to define the second negative pressure space 73. The second negative pressure space 73 is communicated with the second suction generating means.

In the second negative pressure space 73, an injection port of a water spray nozzle 75 for spraying washing water toward the object surface 1 is opened. When the cleaning operation of the object surface 1 is started, the water is sprayed toward the object surface 1 which is located just in front of the movement direction of the suction cup seal member 62.

The water spray nozzle 75 is connected to a water pressure pump (not shown) via a water pressure feed hose 751.

In the cleaning operation, the dirt and water separated from the object surface 1 by the scraping-off action of the free end portion of the suction cup seal member 62 are removed by the action of a vacuum pump (not shown) connected to the second suction hose 741 in the direction of the arrow, and is recovered by suction.

The operation of the device of the embodiment of the present invention will be described below.

When the object surface 1 such as a window glass of a building is to be cleaned, the suction cup 6 provided in the suction-adhering self-propelled robotic device 2 is communicated with a suction generating means (not shown) so that the suction cup 6 is suction-adhering to the object surface 1. FIGS. 1 and 3 to 5 show a state in which the device according to the embodiment of the present invention is suction-adhering to the object surface 1.

Figure 4:
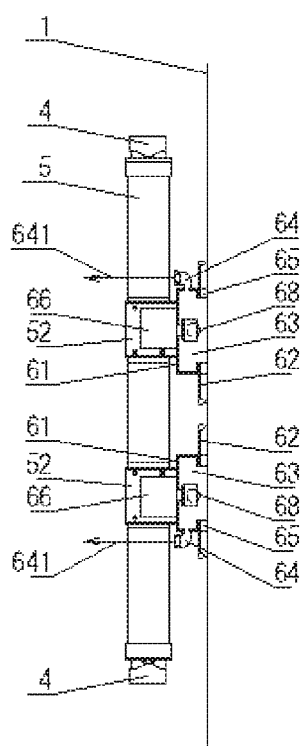
FIG. 4 is a cross-sectional view of the device shown in FIG. 1 taken along the line A-A, showing a state in which the ball roller 68 is retracted.
Figure 5:
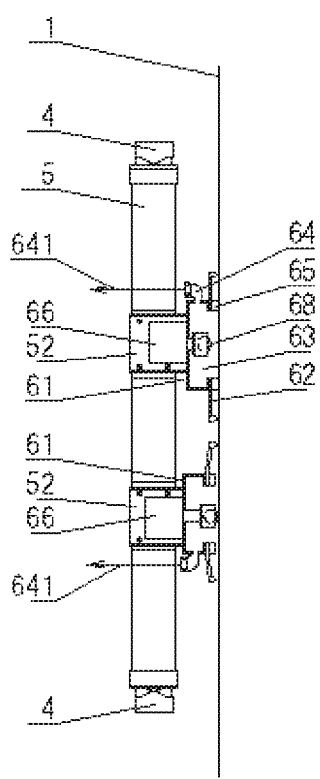
FIG. 5 is a cross-sectional view of the device shown in FIG. 1 taken along the line A-A, showing a state in which the ball roller 68 protrudes.
Figure 6:
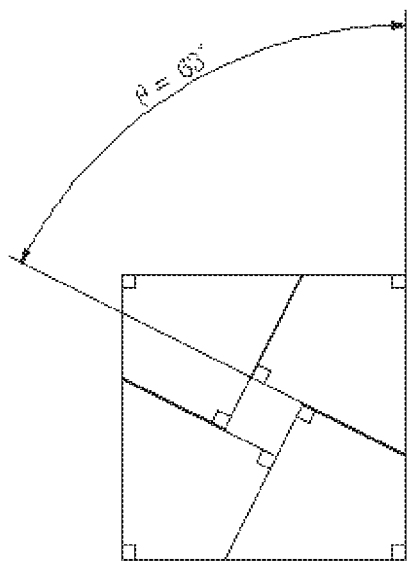
FIG. 6 is a first schematic view of a suction cup group provided in the device shown in FIG. 1.
Figure 7:
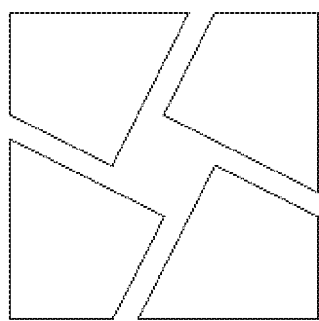
FIG. 7 is a second schematic view of a suction cup group provided in the device shown in FIG. 1.

In FIG. 4, the upper and lower ball rollers 68 are retracted, and in FIG. 5, the lower ball roller 68 protrudes.

In FIG. 5, when the distance between the two piston rods of the Y-axis dual rodless cylinder 5 is increased, the lower suction cup 6 moves downward while suction-adhering to the object surface 1, due to the phenomenon that the frictional force between the upper suction cup 6 and the object surface 1 is great and the frictional force between the lower suction cup 6 and the object surface 1 is small, and at the same time, a cleaning operation is performed on the object surface 1.

Figure 8:
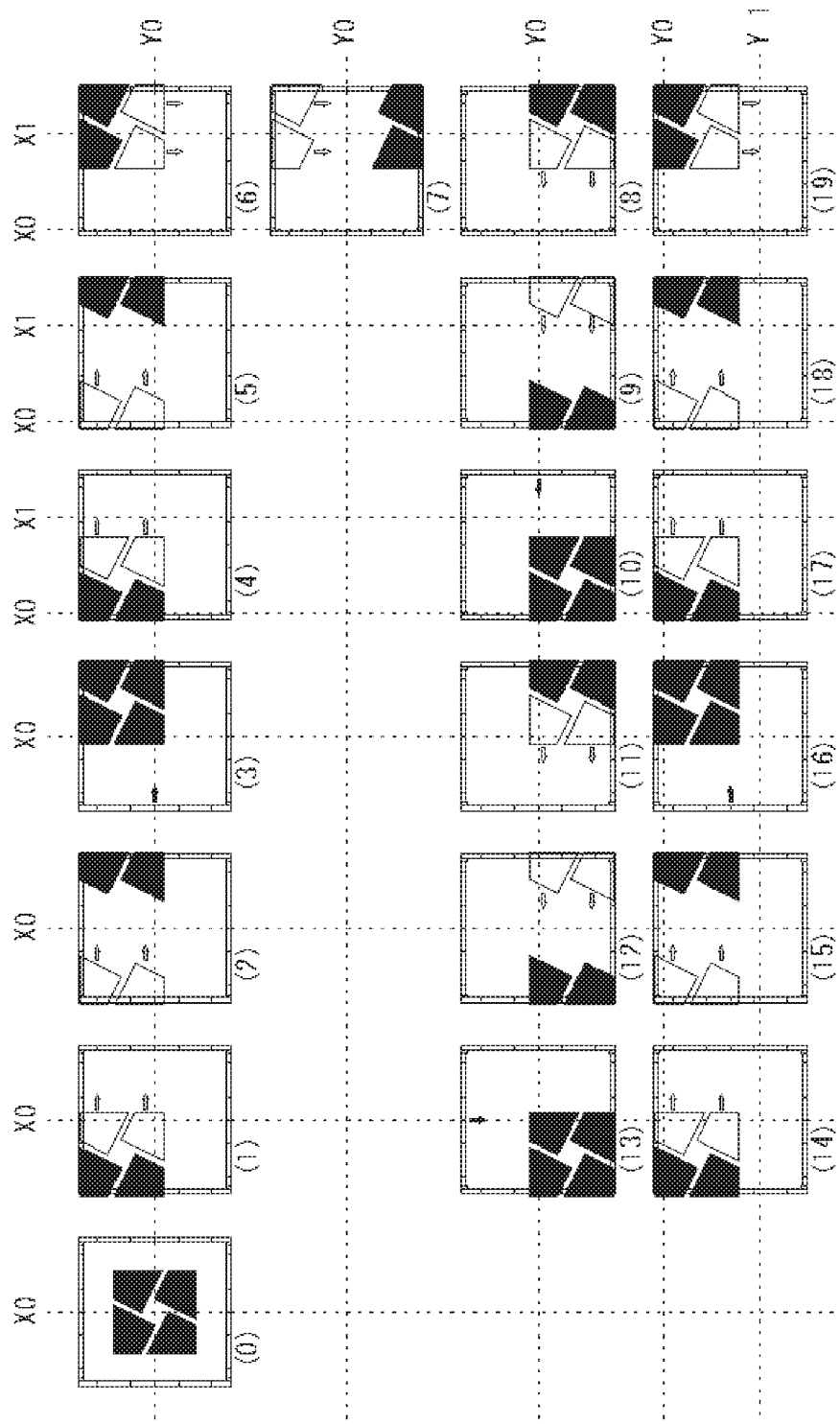
FIG. 8 is a time-series diagram showing a procedure in which the device shown in FIG. 1 performs cleaning on the object surface 1 while suction-adhering is performed on the object surface 1 and moving from left to right along the object surface 1, then moving from top to bottom, then moving from right to left, then moving from top to bottom, and then moving from left to right.
Figure 9:
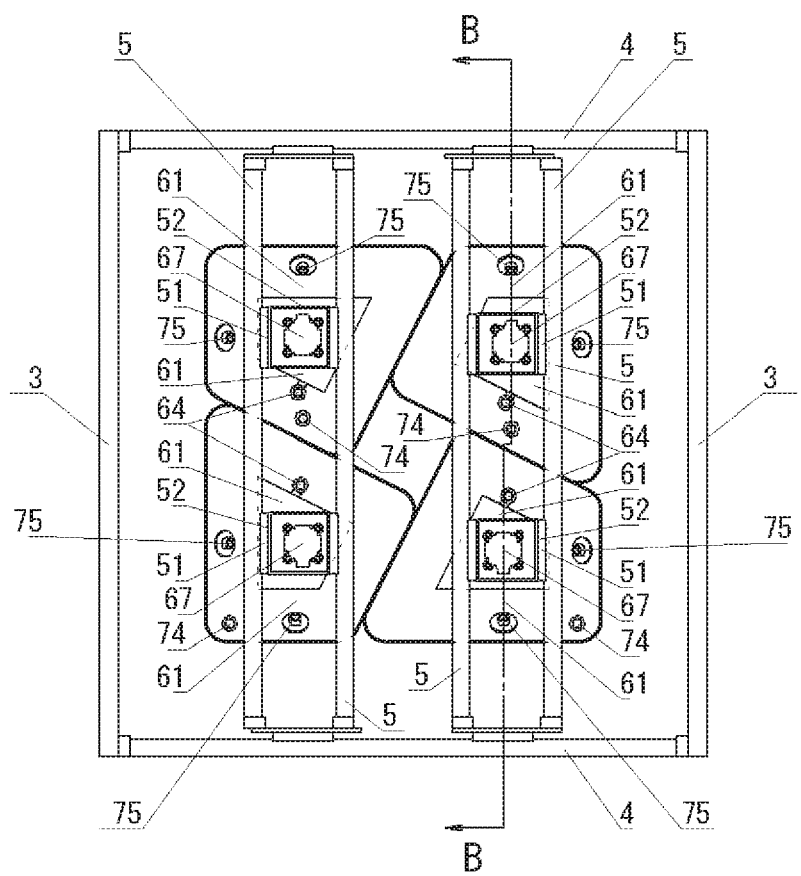
FIG. 9 is a front view of a second preferred embodiment of the device constructed in accordance with the present invention.
Figure 10:
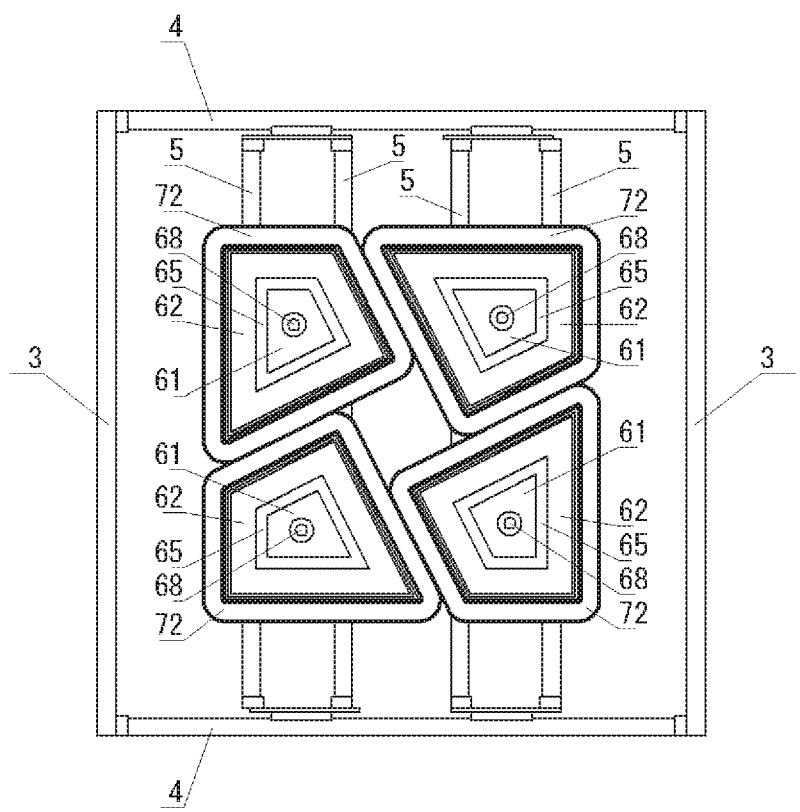
FIG. 10 is a rear view of the device shown in FIG. 9 as seen from the direction of the object surface.
Figure 11:
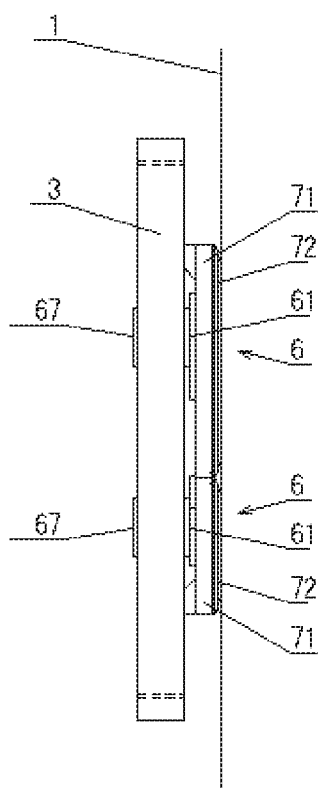
FIG. 11 is a right side view of the device shown in FIG. 9.
Figure 12:
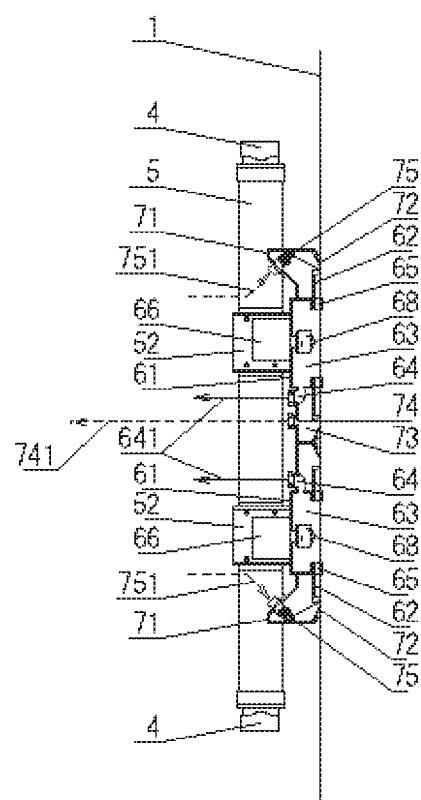
FIG. 12 is a cross-sectional view of the device shown in FIG. 9 taken along the line B-B, showing a state in which the ball roller 68 is retracted.

FIG. 8 illustrates a schematic view and illustrates a time-series sequential configuration of four suction cups in which a suction-adhering self-propelling robotic device of the present invention cleans an object surface while suction-adhering to the object surface and moving from left to right, then moving from right to left, then moving from right to left, then moving from top to bottom, then from left to right, and then moving from left to right.

In FIG. 8, the procedure of the suction-adhering self-propelled time series or the embodiment of the time series order of the four suction cups is shown by (0) to (19).

In FIG. 8, the white arrow indicates the direction in which the suction cup, indicated by a white square, which is unlocked by the protrusion of the ball roller, moves from there.

The black arrow indicates the direction in which the outer frame of the suction-adhering self-propelled robotic device moves from this position. The suction cups with the ball rollers retracted and locked are shown as squares painted on lattice stripes.

As understood from FIG. 8, the suction-adhering self-propelled robotic device 2 of the present invention performs cleaning on the object surface 1 while moving along the object surface 1 from top to bottom as a whole by repeating the procedures (1) to (14) in FIG. 8.

While the preferred embodiments of the device constructed in accordance with the present invention have been described in detail with reference to the attached drawings, it is not intended that the invention be limited to such embodiments and that various changes or modifications may be made therein without departing from the scope of the invention.

The present invention can be applied to various structures as a device for performing various types of work such as cleaning and inspection work safely and efficiently by remote control on the surface of objects of structures, etc.

In particular, the present invention can be effectively applied to cleaning works of buildings having glass windows on all outer wall surfaces and buildings having large inner wall surfaces made of glass.

What is claimed is:

1. A suction-adhering and self-propelled robotic device that can adhere to a surface of an object by negative-pressure suction and that can travel in a Y-axis direction and an X-axis direction, comprising:
four suction cup units that are arranged in two rows with two suction cup units in a row respectively, Y-axis actuators that move each suction cup unit in the Y-axis direction, and X-axis actuators that move each suction cup unit in the X-axis direction;

wherein each suction cup unit includes a suction cup, a frictional force adjustment mechanism that is attached to the suction cup in order to decrease or to increase a frictional force between the suction cup and the surface of the object, and a fluid extraction unit that is communicated with and extracts a fluid from a negative-pressure space that is surrounded by the suction cup and the surface of the object;

the suction cup includes a suction cup frame member and a vacuum sealing member that is disposed in an outer peripheral portion of the suction cup frame member;

the frictional force adjustment mechanism includes a mechanism to push strongly a slippery material including a roller to the surface of the object so that the frictional force between the suction cup and the surface of the object is decreased;

or the frictional force adjustment mechanism includes another mechanism to decrease the pressure of the negative-pressure space that is surrounded by the suction cup and the surface of the object so that the frictional force between the suction cup and the surface of an object is decreased;

each suction cup has a same quadrangle planer shape that roughly forms a square, the suction cup includes two right-angle portions and a diagonal portion, one right angle of the two right-angle portions of each suction cup overlaps with one of the four right angles of the square, two sides that constitute the right angle of the suction cup overlap with two edges that constitute the right angle of the square, and one of the sides that constitute another right angle of the suction cup intersects at an acute angle in one side of the right angle of the square, and another side intersects at an obtuse angle in another side of the right angle of the square.

2. The suction-adhering and self-propelled robotic device according to claim 1, wherein an angle of the acute angle is 63 degrees.

3. The suction-adhering and self-propelled robotic device according to claim 1, wherein the robotic device further includes Z-axis actuators that move each suction cup unit in a Z-axis direction intersecting the surface of the object so that the suction cup is apart from the surface of the object.

4. The suction-adhering and self-propelled robotic device according to claim 1, wherein a second suction cup is formed at the outer peripheral portion of each suction cup, the second suction cup includes a second suction cup frame member fixed at the outer peripheral portion of the suction cup frame member, the second suction cup includes a second vacuum sealing member that is attached to an outer peripheral portion of the second suction cup frame member, a second fluid extraction unit is communicated with a second negative-pressure space that is surrounded by the suction cup frame member, the vacuum sealing member, the second suction cup frame member, the second vacuum sealing member and the surface of the object so that the second fluid extraction unit extracts a fluid from the second negative-pressure space, and a fluid jetting nozzle is disposed in the second negative-pressure space so that a fluid including water or a cleaning agent is ejected toward the surface of the object from the fluid jetting nozzle.

* * * * *